United States Patent
Uekusa

[15] 3,665,557
[45] May 30, 1972

[54] APPARATUS FOR REMOVING RED MEAT FROM FISHES

[72] Inventor: Hideo Uekusa, Tokyo, Japan
[73] Assignee: Toyo Seikan Kaisha, Ltd., Tokyo, Japan
[22] Filed: Apr. 21, 1970
[21] Appl. No.: 30,446

[30] Foreign Application Priority Data

Apr. 24, 1970 Japan....................................45/31650
Apr. 7, 1970 Japan.............................45/29583

[52] U.S. Cl......................................................17/61, 17/52
[51] Int. Cl...........................................................A22c 25/14
[58] Field of Search..........................................17/61, 52, 54

[56] References Cited

UNITED STATES PATENTS 2,565,727  8/1951  Henderson...................................17/54
3,460,193  8/1969  Yoshida......................................17/61

FOREIGN PATENTS OR APPLICATIONS 111,513   9/1967  Norway......................................17/61

Primary Examiner—Lucie H. Laudenslager
Attorney—Wenderoth, Lind & Ponack

[57] ABSTRACT

In apparatus for separating and removing the red meat from the white meat of a fish there are provided a conveyor for successively transferring sections of a fish which are prepared by longitudinally splitting the fish; a knife mechanism positioned along the conveyor and including a pair of opposing cutting blades and means for progressively varying the cutting angle and cutting depth of the cutting blades through the split sections in synchronism with the movement thereof so as to cause the cutting blades to cut through the interface between the red and white meat of the split sections throughout the length thereof; and a deep cutting mechanism positioned along the conveyor and including a pair of opposed rotary cutters perpendicular to the path of travel of the split sections and cam means for progressively varying the depth of cut of the rotary cutters through the split sections to position the outer ends of the rotary cutters at the deepest positions of the red meat throughout the length of the split sections.

8 Claims, 17 Drawing Figures

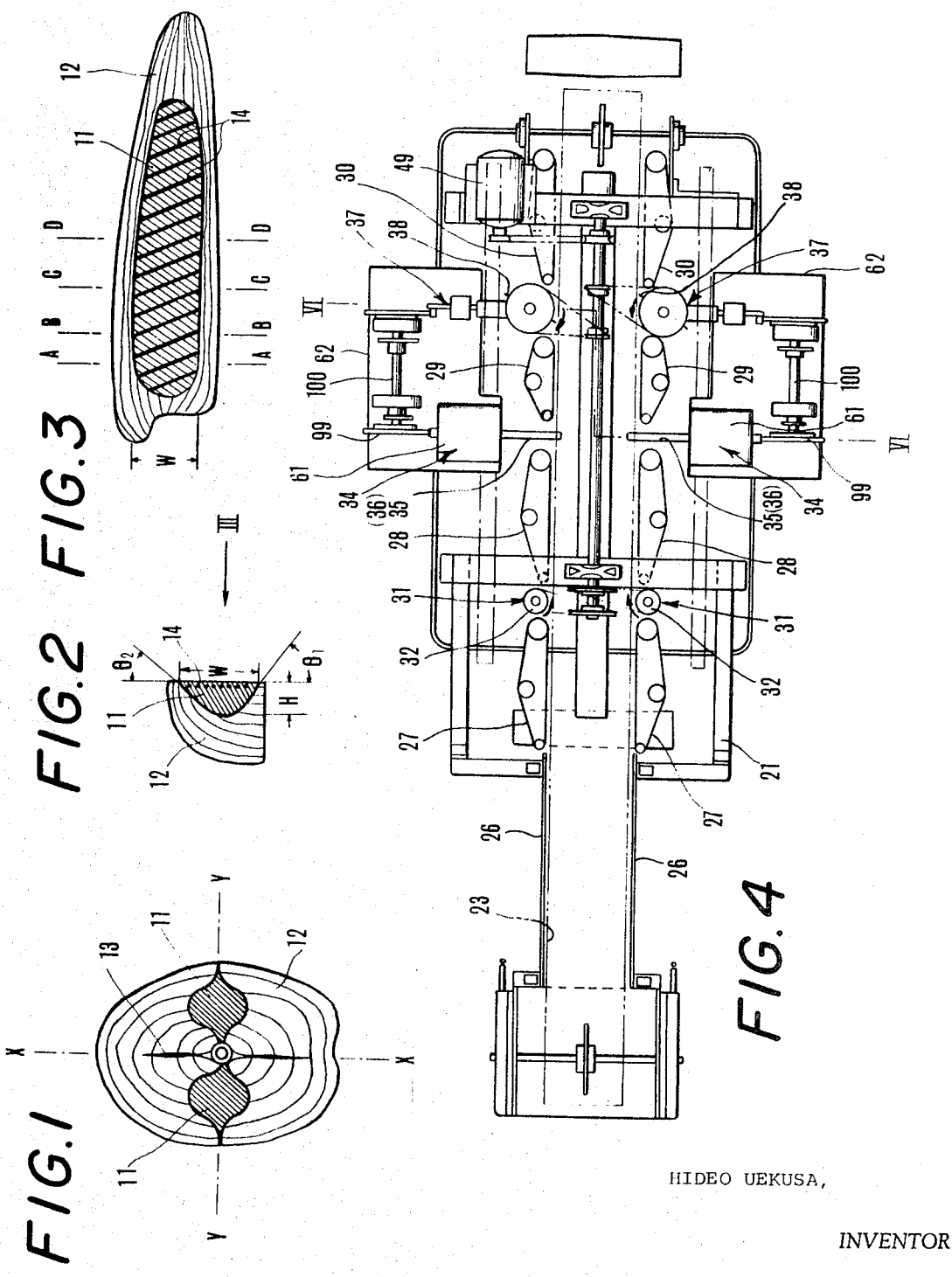

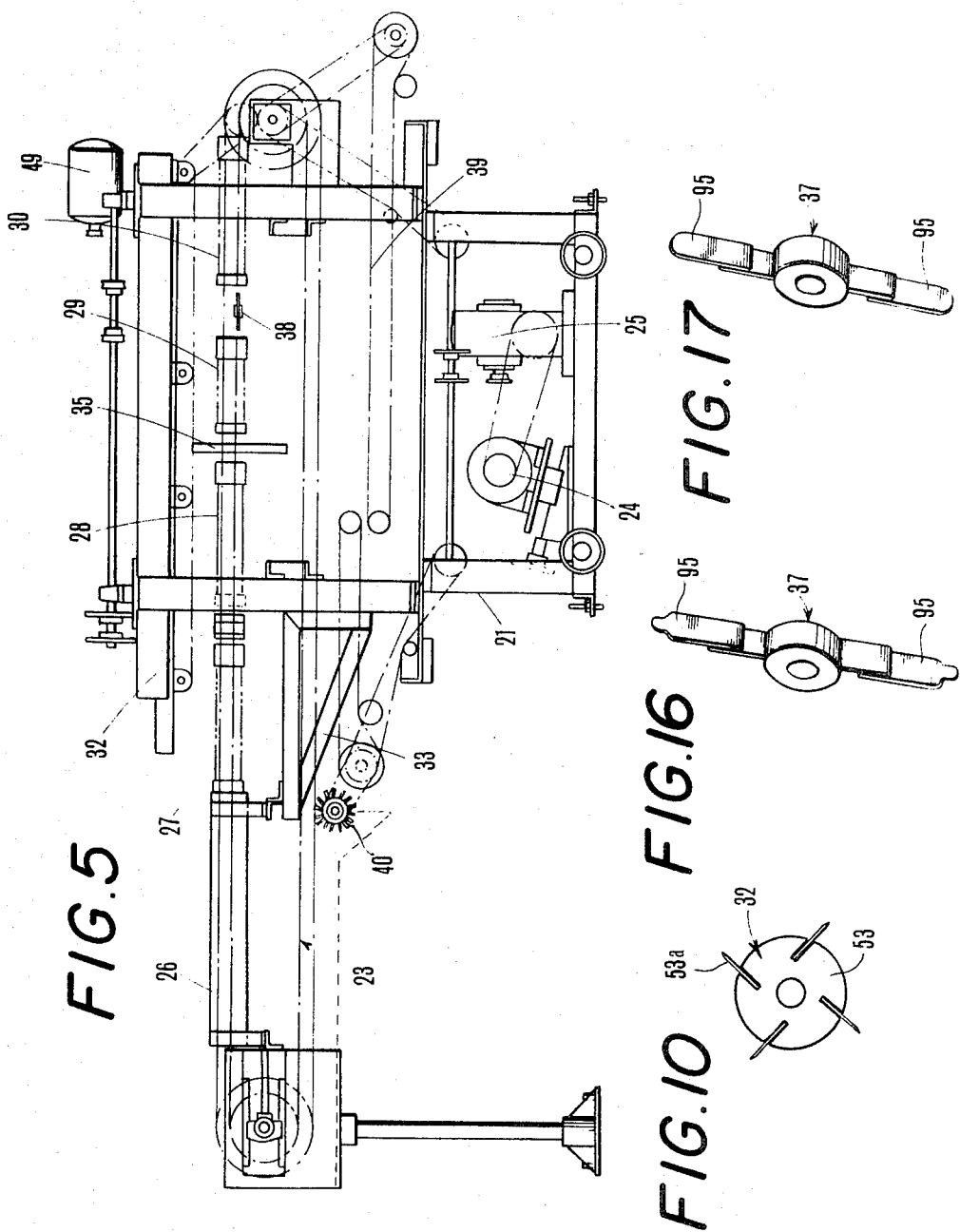

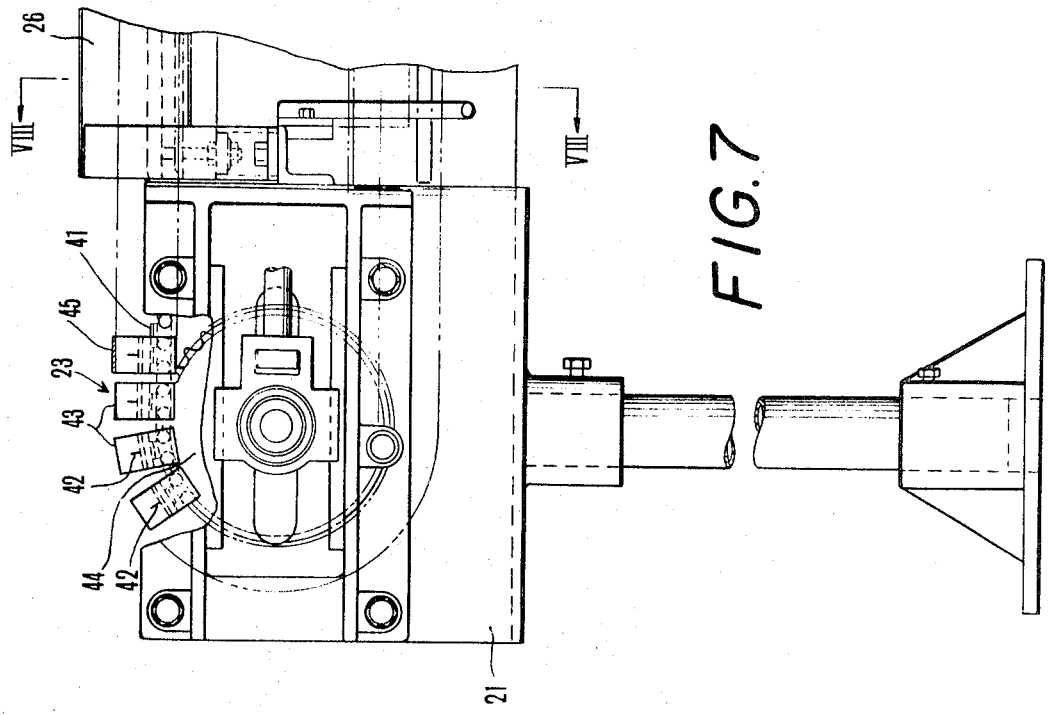
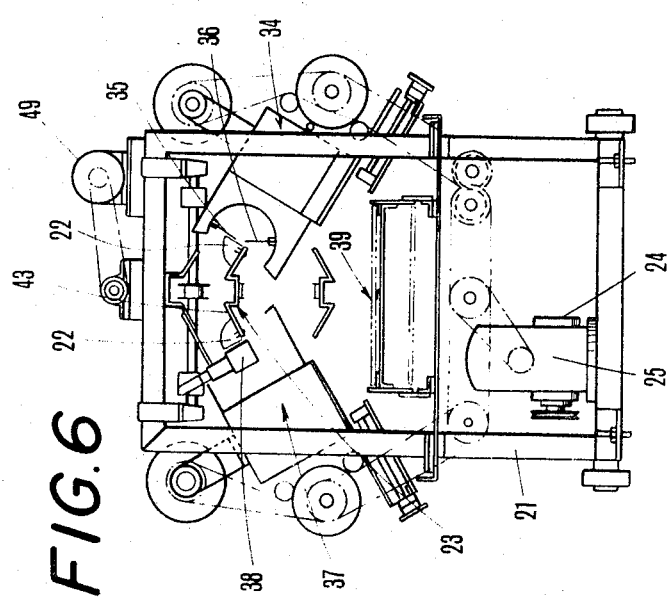

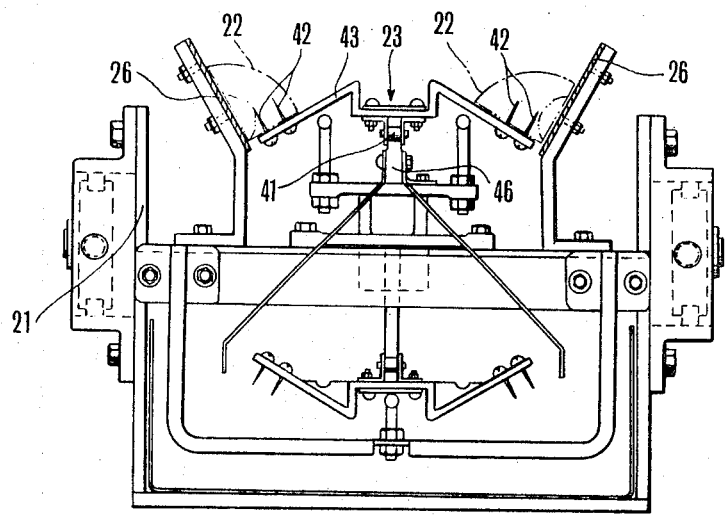
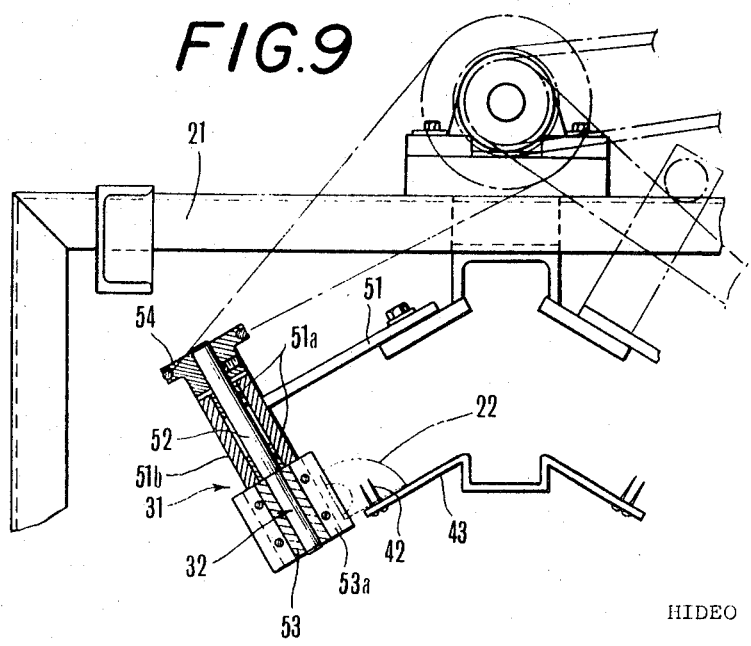

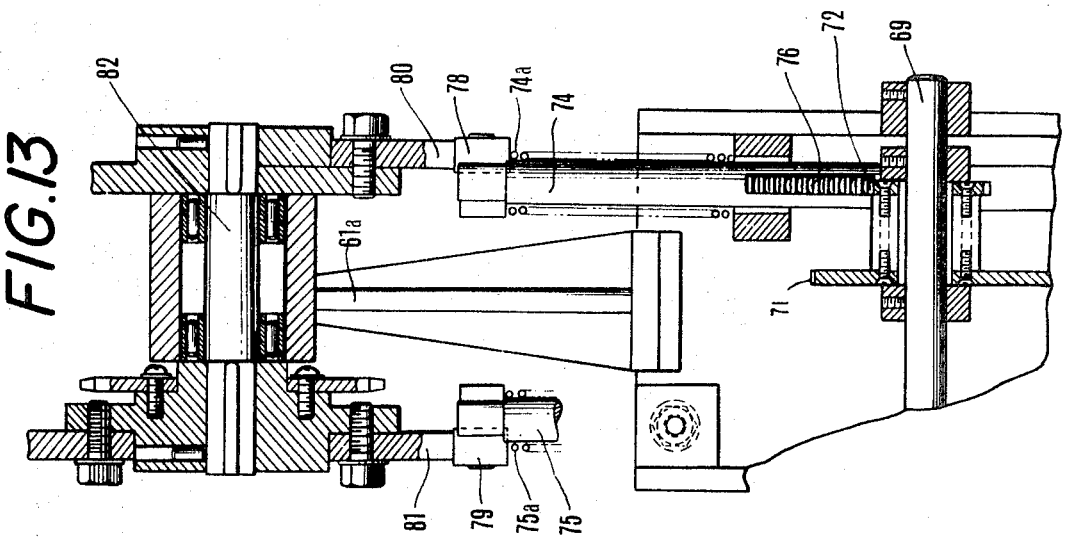
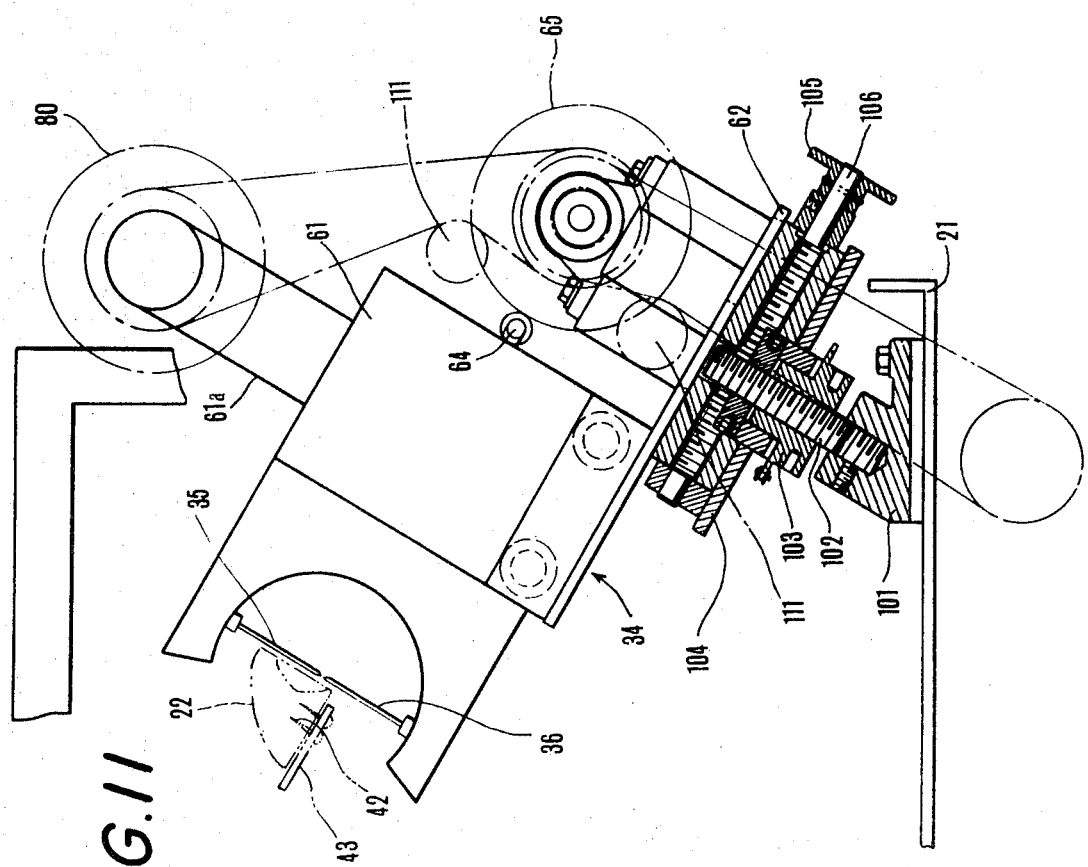

HIDEO UEKUSA,
INVENTOR

APPARATUS FOR REMOVING RED MEAT FROM FISHES

BACKGROUND OF THE INVENTION

This invention relates to apparatus for automatically and effectively removing red meats or dark meats from fishes by the conveyor system.

The fish structure ordinarily contains a white meat (ordinary meat) and a red meat composed of different types of protein. Where canned goods are to be prepared from large fishes such as tunas the red meat must be removed, and the removed red meat is utilized to prepare another type of food stuffs.

At present, the removal of the red meat is performed by an operator with a hand knife and the operator should take care to completely remove the red meat but not remove the white meat together with the red meat in order to assure high yield of the white meat. For this reason, the red meat removal operation requires considerable labor and time so that more than one half of the operators of a canning plant are required to engage this operation. It has been desired for many years to develop a machine capable of automatically separating and removing red meats from fishes so as to realize the full automation of the canning plant.

SUMMARY OF THE INVENTION

Accordingly it is an object of this invention to provide a novel machine capable of automatically removing the red meat from fishes by the conveyor system.

Another object of this invention is to provide a novel machine capable of continuously removing only the red meat from fishes which are split longitudinally and are moved by the conveyor system.

Yet another object of this invention is to provide a new and improved machine which can remove only the red meat but not remove other useful portions even though the configuration, depth, width and penetration angle of the red meat are different dependent upon the size and type of the fish.

A further object of this invention is to provide a novel machine which effectively performs a series of steps of removing small bones, and cutting through by means of a knife to the deepest portions while sections of a fish prepared by splitting it longitudinally into four sections are conveyed by a conveyor.

According to a preferred embodiment of this invention, there is provided apparatus for removing the red meat from a fish comprising a conveyor for successively transferring sections of a fish, said sections being prepared by longitudinally splitting said fish, a knife mechanism positioned along said conveyor, said knife mechanism including a pair of upper and lower cutting blades and means including a cam for progressively varying the cutting angle and cutting depth of said cutting blades with respect to said split sections of fish in synchronism with the movement thereof so as to cause said cutting blades to cut through the interface between the red meat and the white meat of said split sections through the length thereof; and a deep cutting mechanism positioned along said conveyor, said deep cutting mechanism including a pair of opposed rotary cutters perpendicular to the path of travel of said split sections of said fish and cam means for progressively varying the depth of cut of said rotary cutters through said split sections to position the outer ends of said rotary cutters at the deepest portions of said red meat throughout the length of said split sections.

BRIEF DESCRIPTION OF THE DRAWINGS

The invention can be more fully understood from the following detailed description taken in connection with the accompanying drawings in which:

FIG. 1 shows a typical transverse section of a fish;

FIG. 2 shows a sectional view of one section of the fish when it is split longitudinally into four sections along lines X—X and Y—Y in FIG. 1;

FIG. 3 is a side view of the section shown in FIG. 2 when it is viewed in the direction of an arrow III;

FIG. 4 is a plan view of one example of a red meat removing apparatus embodying this invention;

FIG. 5 shows a side elevation of the apparatus shown in FIG. 4;

FIG. 6 is a sectional view taken along a line VI—VI in FIG. 4.

FIG. 7 shows a side elevation, partially broken away, of a portion of a conveyor for transferring fishes;

FIG. 8 is a sectional view of the conveyor shown in FIG. 7, taken along a line VIII—VIII.

FIG. 9 shows a front elevation, partially broken away, of a small bone removing mechanism;

FIG. 10 shows one example of a rotary cutter employed in the mechanism shown in FIG. 10;

FIG. 11 shows a front elevation, partially broken away, of a knife mechanism;

FIG. 13 is a sectional view taken along a line XIII—XIII in FIG. 12;

FIGS. 16 and 17 are perspective views showing different types of the rotary cutters employed in the deep cutting mechanism shown in FIG. 15.

DESCRIPTION OF THE PREFERRED EMBODIMENT

Figure 12:
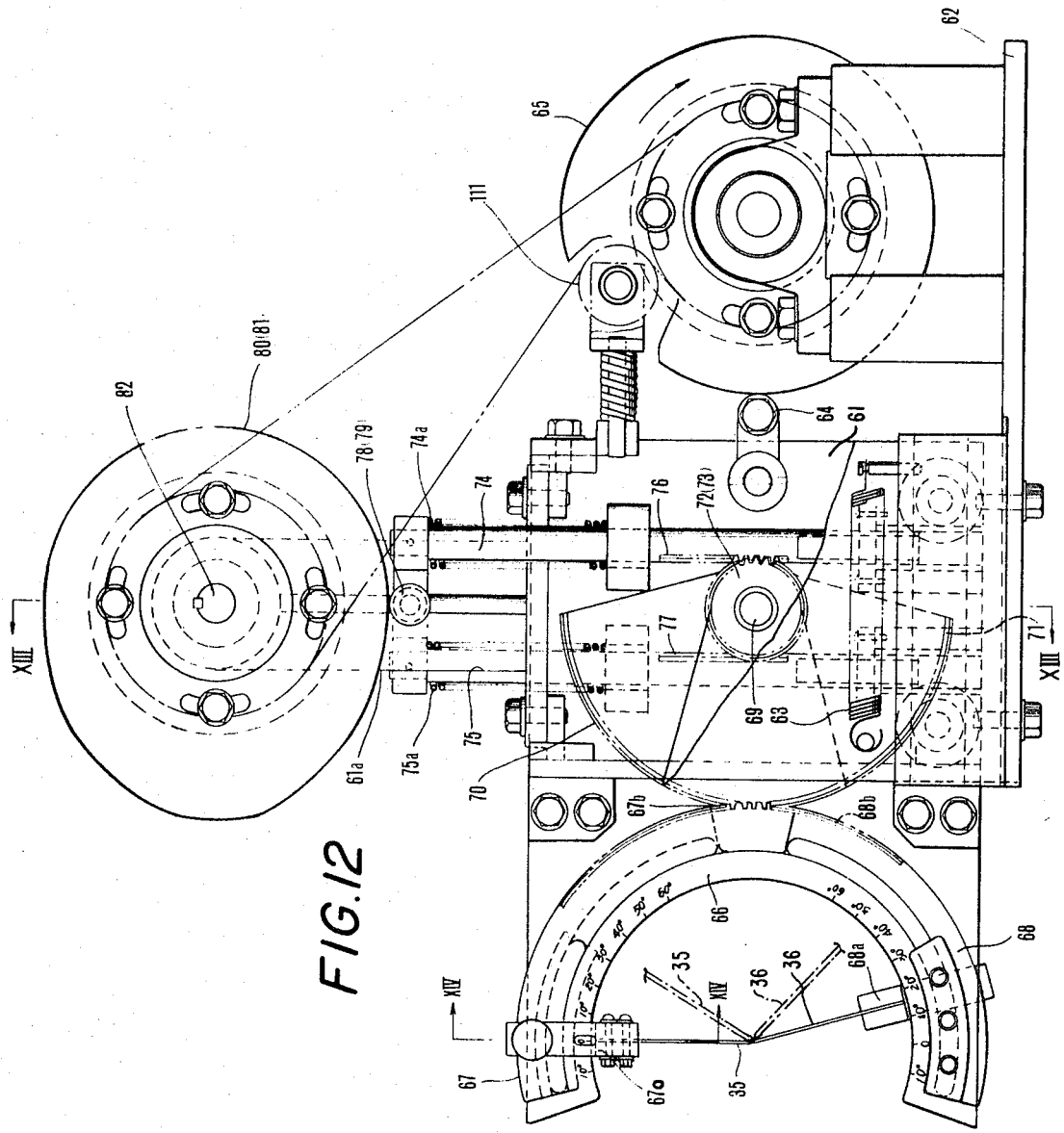
FIG. 12 is a front elevation of the knife and its operating mechanism.
Figure 14:
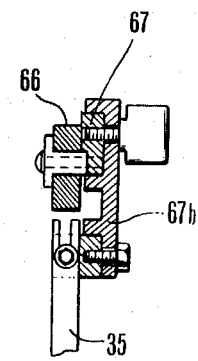
FIG. 14 is a sectional view taken along a line XIV—XIV in FIG. 12.

Referring now to the accompanying drawings, as diagrammatically shown in FIG. 1 red meats 11 of a large fish such as tuna are contained in substantially the central portion of the white meat 12, and are symmetrical with respect to the vertical plane including the longitudinal axis of the fish. When a fish is longitudinally split into four sections along lines X—X and Y—Y and after removal of the trunk bone, the red meat 11 becomes exposed on one side of each section as shown in FIGS. 2 and 3. The depth H, the width W and angles of penetration $\theta_1$ and $\theta_2$ are not equal for respective sections A—A, B—B, C—C and D—D in FIG. 3. More particularly, the width of the red meat 11 gradually decreases from the head to the tail whereas the depth H is largest at the longitudinal center of each section and gradually decreases toward the head and tail. Further, the penetration angles $\theta_1$ and $\theta_2$ are the smallest at the head and gradually increases toward the tail. As shown in FIGS. 2 and 3, a number of small bones 14 are contained in the surface layer of the red meat 11 when the fish is split into four sections.

With reference now to FIGS. 4 through 17, there is shown one example of the novel apparatus for simultaneously removing the red meat from two sections of a fish split in the longitudinal direction.

As shown in FIGS. 4 to 6 a conveyor 23 is mounted on a longitudinal machine frame 21. The conveyor 23 is driven by an electric motor 24 via a speed reduction mechanism 25 to transfer split sections of the fish from left to right as viewed in FIGS. 4 and 5. Side guide plates 26 are mounted on the opposite sides of the entry portion of the conveyor 23 and a plurality of side belt conveyors 27, 28, 29 and 30 are disposed in succession to the right of the side guide plate 26 along the path of travel of split sections of the fish 22. These side belt conveyors 27 through 30 are driven by another motor 49. Each split section 22 is mounted on the left hand end of the conveyor 23 with its red meat faced outward. The opposite sides of the split section are supported by guide plates 26 and side belt conveyors 27 through 30 to prevent soft fish sections from being deformed or bulged outwardly.

A small bone removing mechanism 31 to be described later in more detail is disposed between side belt conveyors 27 and 28. The small bone removing mechanisms 31 includes a pair of opposed rotary cutting blades 32 to cut and remove small bones together with the surface layer portions of the split section containing such small bones thus providing a smooth and flat surface. A small bone discharge conveyor 33 is disposed beneath the small bone removing mechanism and is driven by the motor 24 to discharge removed small bones and surface layer to the left as viewed in FIG. 5.

Knife mechanisms 34 are installed between side belt conveyors 28 and 29 and are provided with a pair of opposed cutting blades 35 and 36 which are arranged to rotate in a plane perpendicular to the path of travel of the slitting sections of the fish to cut through the interface between the red meat and the white meat to separate them.

Deep cutting mechanisms 37 are disposed between side conveyor belts 29 and 30 and are provided with opposed rotary cutters 38 which are arranged to be rotated in a plane perpendicular to the path of travel of the split sections of the fish to cut away deepest portions of the red meat that have not been removed by cutting blades 35 and 36.

Beneath the knife mechanism 34 and the deep cutting mechanism 37 is disposed a red meat discharge conveyor 39 (FIG. 5) which is driven by the motor 24 to discharge the red meat falling from mechanisms 34 and 37 to the right as viewed in FIG. 5.

As best shown in FIG. 5, a rotary brush 40 driven by the motor 24 is associated with transfer conveyor 23 to clean the surface thereof after removal of the red meat.

Cutting blades 32 of the small bones removing mechanism and rotary cutters 38 of the deep cutting mechanism 37 are driven by said motor 49.

Although in the embodiment shown in FIGS. 4 through 6 the deep cutting mechanism 37 is installed to follow the knife mechanism 34 it will be clear that the order of installation of these mechanisms may be reversed.

The transfer conveyor 23, small bone removing mechanisms 31, knife mechanisms 34 and deep cutting mechanisms 37 will now be described in detail hereunder. Except the transfer conveyor 23, as the mechanisms on the opposite sides are identical only one of them will be discussed.

As shown in FIGS. 7 and 8 the transfer conveyor 23 comprises an endless chain 41 passing around a sprocket wheel 44. Endless chain 41 carries a plurality of spaced apart fish supporting plates 43 each inclining toward the outer edges at which a plurality of pointed piercing needles or plates 42 are mounted to project upwardly. Reference marks 45 are applied to supporting plates at intervals of a predetermined number of plates. The conveyor chain 41 is arranged to run along a rail 46 secured to the frame 21. Each split section of the fish 22 is mounted on several supporting plates 43 between adjacent reference marks 45 and is held in position with the red meat faced outwardly by being pierced by piercing needles 42. The split sections are mounted on the conveyor chain 41 at the left hand end of the machine as viewed in FIGS. 4 and 5 and are finally discharged from the supporting plates 43 at the right hand end of the machine after removal of the red meat and small bones in a manner described above.

As shown in FIG. 9, the small bone removing mechanism 31 comprises a rotary cutter 32 which is supported by a bracket 51 secured to frame 21. More specifically, the rotary shaft 52 of rotary cutter 32 is journalled by bearings 51a disposed in a sleeve 51b supported by bracket 51. The lower end of shaft 52 supports a hub 53 having a plurality of radial cutting blades 53a while a pulley 54 is secured to the upper end of shaft 52. While the split section of side conveyor belts 27 and 28, pulley 54 is driven by motor 49 through a suitable motion transmission mechanism such as a belt to rotate hub 53 and cutting blades 53a to remove the surface layer portion of the red meat containing small bones.

When mounting a split section of the fish 22 on fish supporting plate 43 the split section is mounted by utilizing side guide plate 26 as the reference surface. Accordingly, the surface of the red meat of the split section of the fish mounted on the supporting plate 43 travels a definite path. The tips of the small bone cutting blades 53a of the small bone removing mechanism 31 are positioned such that they can cut through a depth from the surface of the guide plate, said depth corresponding the depth of the small bones from the surface of the red meat. (This is shown by phantom lines in FIG. 9.)

The position of the small bone removing mechanism 31 is preset with reference to the surface of the guide plate after visually determining the depth of the small bones for respective lots of the split sections of the fish.

Since the small bone removing mechanism 31 is driven by electric motor 49 independently of the conveyor drive, once it is set as above described, the mechanism 31 operates to remove small bones with a definite cutting depth for the split sections of the fish mounted on the fish supporting plate 43 thus smoothing the surface of the red meat.

The purpose of providing a smooth and flat surface free from small bones is to prevent damage of knives of the knife mechanisms which receives the preworked split section.

The axial length of respective cutting blades 53a is made sufficiently large so that the machine can treat the largest fishes. As shown in FIG. 10 cutting blades 53a may be secured to hub 52 at an angle to improve cutting operation.

As shown in FIGS. 11 through 14, the knife mechanism 34 comprises a main body 61 slidably mounted on a base 62 secured to frame 21 in a direction perpendicular to the path of travel of the fish. Main body 61 is biased outwardly (to the right as viewed in FIGS. 11 and 12) away from the fish by means of tension springs 63 interposed between main body 61 and base 62. A first cam roller 64 (see FIG. 12) is mounted to one side of body 61 to cooperate with a first circular disc cam 65 which is supported by base 62 and which is driven by motor 24 in synchronism with transfer conveyor 23. Thus as the disc cam 65 is rotated, main body 61 of the knife mechanism is moved to the left or right as viewed in FIG. 12 through the first cam roller 64 to adjust the cutting depth into the fish of a pair of upper and lower cutting blades 35 and 36. A semicircular cutting blades holder 66 (see FIG. 12) is secured to the main body 61 and near the opposite ends of the holder 66 are mounted arcuate sliding members 67 and 68 so as to be slidable along an arc of a circle. The upper and lower cutting blades 35 and 36 are secured to sliding members 67 and 68 through mounting members 67a and 68a respectively, as best shown in FIG. 12. Outer edges of the upper and lower cutting blades 35 and 36 contact each other and the angle of these cutting blades with respect to the horizontal can be varied by the independent sliding movement of sliding members 67 and 68. Teeth 67b and 68b formed on the outer peripheries of sliding members 67 and 68 mesh with sector gears 70 and 71, respectively, secured to a shaft 69. Pinions 72 and 73 secured to the shaft 69 mesh with racks 76 and 77, respectively, formed on vertically reciprocating rods 74 and 75. These reciprocating members are slidably supported by main body 61 and are urged upwardly by compression springs 74a and 75a to urge the second and third cam rollers on the upper end of the vertically reciprocating rods 74 and 75 against the second and third circular disc cams 80 and 81. These circular disc cams are mounted on a shaft 82 journalled by a supporting pedestal 61a extending upwardly from main body 61 and the shaft 82 is driven in synchronism with the first disc cam 65. As the second and third cams 80 and 81 are rotated, rods 74 and 75 are moved in the vertical direction through cam rollers 78 and 79 whereby sliding members 67 and 68 are rotated via racks 76 and 77, pinions 72 and 73 and sector gears 70 and 71 to independently adjust the angle of cutting of the upper and lower cutting blades with respect to the fish. Rack 76 is operated in the vertical direction by the rotation of cam 80 having a contour determined by the configuration of the red meat. Pinion 72 meshes with rack 76 and a sector gear 71 meshes with gear teeth 68b of sliding member 68. Knife holder 68a carrying lower knife 36 is adjustably mounted on sliding member 68.

Assuming now that rack 76 is moved downwardly by the rotation of cam 80, pinion 72 is rotated in the clockwise direction as viewed in FIG. 12 so that the sliding member 68 is rotated in the counterclockwise direction through sector gear 71 secured to pinion 72 and gear teeth 68b, thus shifting knife 36 to the position shown by phantom lines in FIG. 12.

Usually, the upper knife 35 is arranged to be shifted symmetrically with respect to the lower knife. More particularly, as the rack 77 is moved downwardly by the operation of cam 81, pinion 73 and sector gear 70 secured thereto are rotated in the counterclockwise direction to rotate sliding member 67 in the clockwise direction. Knife holder 67a carrying the upper knife 35 is adjustably mounted on sliding member 67 so that knife 35 is shifted to the position indicated by phantom lines. By the displacement of upper and lower knives 35 and 36 just described, the penetration angles of the knives into the red meat can be varied.

The knife mechanism including knives 35 and 36 is mounted on housing 61 which slides to the left or right by means of the rotation of cam 65 through cam roller 64 whereby the penetration depth of the knives in the red meat is varied. Cames 65, 80 and 81 are designed to complete one revolution respectively for one pitch advancement of the split section of the fish.

The profiles of the first to third circular disc cams 65, 80 and 81 are determined with due consideration of the configuration of the red meat to be removed so as to move to the right or left and to vary the angle of upper and lower cutting blades 35 and 36 to commensurate with the depth and varying angle of penetration of the red meat. Further disc cams 65, 80 and 81 are designed to treat one split section of the fish at each one complete revolution thereof, and to commence cutting of the split section at each supporting plate 43 of the transfer conveyor 23 provided with the reference mark 45 to separate the red meat from the white meat at the interface therebetween. The position and angle of cutting blades 35 and 36 are adjusted by the rotation of cams 65, 80 and 81 such that the red meat is separated precisely along the interface. However, since it is impossible to cross the outer ends of the cutting blades 35 and 36, the deepest portions of the red meat remain unremoved.

Figure 15:
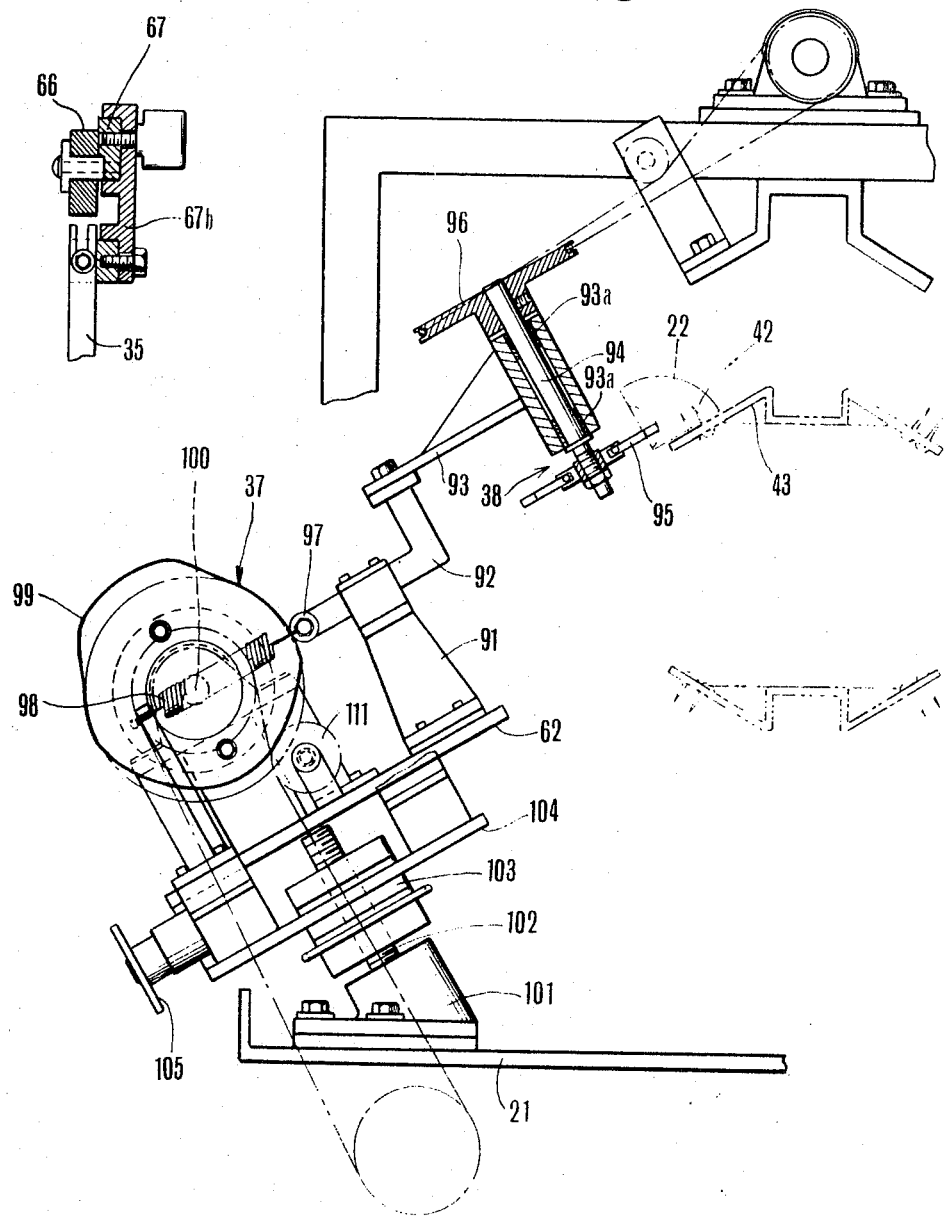
FIG. 15 shows a front elevation of a deep cutting mechanism.

As shown in FIG. 15, the deep cutting mechanism 37 comprises a supporting arm 92 which is mounted on a post 91 free to slide in a direction perpendicular to the path of movement of the fish, said post being secured to base 62 (see FIG. 4) on frame 21 common to the knife mechanism 34. A bracket 93 is secured to the inner end of supporting arm 93 to support bearings 93a rotatably supporting shaft 94 of rotary cutter 38.

Radial cutting knives 95 and a driving pulley 96 are secured to the lower and upper ends of shaft 94 respectively. When the pulley 96 is driven by motor 49 through a motion transmission mechanism, the shaft 94 rotates cutting knives 95 to cut and remove the deepest portion of the red meat of the split section 22 of the fish. Since by this time the interface between the red meat and white meat has been cut through by the cutting blades 35 and 36 of the knife mechanism 34 except the deepest portions, the red meat is readily removed and falls onto discharge conveyor 39. A fourth cam roller 97 is mounted on the other end of the supporting arm 92 and is urged against the periphery of a fourth circular disc cam 99 mounted on base 62 by the action of a tension spring 98. The fourth circular disc cam 99 is driven by motor 24 to move to the right and left rotary cutter 38 through supporting arm 92 and bracket 93 to control the depth of penetration of the cutter 38 into the fish. The fourth circular disc cam 99 has substantially the same configuration as the first circular disc cam 65 and is driven in synchronism with cam 65 and conveyor 23 so as to accurately cut away the red meat in accordance with the variation in the depth of the most deep portions of the red meat.

While in the arrangement shown in FIG. 4 the first and the fourth circular disc cams 65 and 99 are mounted on the same shaft 100 to operate in synchronism, the supporting arm 92 (shown in FIG. 15) may be secured to the main body 61 of the knife mechanism. Further, the configuration of cutting knives 95 of the rotary cutter 38 may be varied in various ways as shown in FIGS. 16 and 17 so as to positively remove the deepest portions of the red meat.

Base 62 common to knife mechanism 34 and deep cutting mechanism 37 may be manually moved in the vertical and horizontal directions to commensurate with the type and size of the fish. More particularly, as shown in FIGS. 11 and 15 a threaded shaft 102 is received in a threaded cylinder 101 secured to frame 21 and a supporting platform 104 is rotatably supported by a member 103 which is threaded on the upper end of the threaded shaft to be adjustable in the vertical direction. Thus the supporting platform 104 is moved in the vertical direction by turning the member 103 to adjust the height of base 62 mounted on the platform 104. A threaded shaft 106 having a hand wheel 105 is rotatably mounted on supporting platform 104 and is connected to base 62 through a nut, not shown, so that when the threaded shaft 106 is rotated by hand wheel 105, the base 62 is moved along the axis of shaft 106. In this manner, the position of cutting blades 35 and 36 of the knife mechanism 34 and the position of the rotary cutter 38 of the deep cutting mechanism 37 can be adjusted or preset to commensurate with the type and the size of the fish by the vertical and horizontal movements of the base 62. Further, it is advantageous to prepare a number of sets of different circular disc cams to selectively use one of them according to the type and the size of the fish.

As shown in FIGS. 11, 12 and 15, a tension pulley 111 is associated with a motion transmitting belt or chain (indicated by dot and dash lines) to take up any slack thereof.

Thus, it will be clear that this invention provides a novel and effective red meat removing apparatus which can remove at high effeciencies only the red meat from fishes of different type and size.

Although a specific embodiment has been disclosed to illustrate the invention, it will be evident that the teachings apply to other types of fishes and that many modifications and variations fall within the scope of this invention. It therefore is to be understood that within the scope of the appended claims, the invention may be practical other than as specifically described.

What we claim is:

1. Apparatus for removing the red meat from a fish comprising a conveyor for successively transferring sections of a fish, said sections being prepared by longitudinally splitting said fish; a knife mechanism positioned along said conveyor, said knife mechanism including a pair of upper and lower cutting blades and means including a cam for progressively varying the cutting angle and the cutting depth of said cutting blades with respect to said split sections of fish in synchronism with the movement thereof so as to cause said cutting blades to cut through the interface between the red meat and the white meat of said split sections throughout the length thereof; and a deep cutting mechanism positioned along said conveyor, said deep cutting mechanism including a pair of opposed rotary cutters perpendicular to the path of travel of said split sections of said fish and cam means for progressively varying the depth of cut of said rotary cutters through said split sections to position the outer ends of said rotary cutters at the deepest portions of said red meat thoughout the length of said split sections.

2. The apparatus according to claim 1 wherein said knife mechanism comprises a first, a second and a third cam mechanisms, said first cam mechanism moves said upper and lower cutting blades towards and away from each other, and said sections and third cam mechanisms operate to rotate said cutting blades to vary the angle between them whereby to vary their cutting angle into said split section of fish.

3. The apparatus according to claim 1 wherein said cam for moving said cutting blades of said knife mechanism and said cam for operating said rotary cutters of said deep cutting mechanism are mounted on the same shaft.

4. The apparatus according to claim 1 wherein the cutting blades of said knife mechanism and the rotary cutters of said deep cutting mechanism are operated by the same cam.

5. Apparatus for removing the red meat from a fish comprising a conveyor for successively transferring sections of a fish, said sections being prepared by splitting said fish into four elongated sections along the trunk bone of said fish; a plurality of side conveyors disposed on both sides of said conveyor along the path of travel of said split sections to engage the exposed surface of the red meat of said split sections when they are transferred; a small bone removing mechanism installed between a pair of adjacent side conveyors, said small bone removing mechanism including a rotary cutter to remove the surface layer of said exposed red meat together with small bones contained therein; a knife mechanism installed between another pair of adjacent side conveyors, said knife mechanism including a pair of upper and lower red meat cutting blades opposing each other in a plane perpendicular to the path of travel of said split sections, and means including a cam for progressively varying the cutting angle and cutting depth of said cutting blades with respect to said split sections of fish in synchronism with the movement thereof so as to cause said cutting blades to cut through the interface between the red meat and the white meat of said split sections throughout the length there of; and a deep cutting mechanism installed between yet another pair of adjacent side conveyors, said deep cutting mechanism including a pair of opposed rotary cutters perpendicular to the path of travel of said split sections of said fish and means for positioning the outer ends of said rotary cutters at the deepest portions of said red meat throughout the length of respective split sections.

6. The apparatus according to claim 5 wherein said small bone removing mechanism, said knife mechanism and said deep cutting mechanism are installed in respective pairs on both sides of said conveyor for transferring said split sections of said fish.

7. The apparatus according to claim 1 wherein said conveyor is in the form of an endless chain comprising a plurality of spaced apart fish supporting plates, and each one of said supporting plates is provided with at least one piercing needle.

8. The apparatus according to claim 7 wherein said supporting plates of said conveyor chain are provided with reference marks at intervals of a predetermined number of said supporting plates, and wherein means is provided whereby the period required for a given reference mark to travel between said knife mechanism and said deep cutting mechanism is made to be equal to the period in which cams for driving knife mechanism and said deep cutting mechanisms rotate a predetermined number of revolutions so as to control the depth of cutting and cutting angle of said cutting blades and depth of cutting of said rotary cutters in accordance with the movement of said split sections.

\* \* \* \* \*